United States Patent [19]

Shiina

[11] 4,147,339
[45] Apr. 3, 1979

[54] SHEET FEED AND POSITIONING MECHANISM

[75] Inventor: Toshio Shiina, Tokyo, Japan

[73] Assignee: Ricoh Company, Ltd., Tokyo, Japan

[21] Appl. No.: 837,492

[22] Filed: Sep. 28, 1977

Related U.S. Application Data

[63] Continuation of Ser. No. 669,558, Mar. 23, 1976, abandoned.

[30] Foreign Application Priority Data

Mar. 26, 1975 [JP] Japan .................................. 50-35295

[51] Int. Cl.² .......................... B65H 9/06; B65H 9/16
[52] U.S. Cl. ........................................ 271/7; 271/236;
271/245; 271/251; 271/265; 271/274
[58] Field of Search ............... 271/236, 245, 246, 265,
271/251, 4, 3, 274, 7, 6

[56] References Cited

U.S. PATENT DOCUMENTS

| | | | |
|---|---|---|---|
| 1,618,625 | 2/1927 | Aldrich | 271/251 |
| 3,370,844 | 2/1968 | Roberts | 271/265 X |
| 3,709,596 | 1/1973 | Ulmer | 271/251 X |
| 3,747,918 | 7/1973 | Margulis et al. | 271/4 |
| 3,844,552 | 10/1974 | Bleau et al. | 271/245 |
| 4,023,791 | 5/1977 | Hori et al. | 271/3 |

*Primary Examiner*—Bruce H. Stoner, Jr.
*Attorney, Agent, or Firm*—Frank J. Jordan

[57] ABSTRACT

An original sheet document for electrostatic reproduction is inserted into the mechanism face up, and the mechanism feeds and positions the document onto a glass platen face down. Endless belts are trained over pulleys forming a plurality of parallel runs which are disposed closely above the platen. Idler feed rollers are disposed above the pulleys which feed the document into engagement with a guide member which reverses the direction of movement of the document by 180° and guides the document between the belts and the platen. The belts are oriented at an angle to the edges of the platen and move the document both forwardly and laterally across the platen. Elongated stops are provided at the edges of the platen toward which the document is moved by the belts, and the document aligningly abuts against the stops. The belts are arranged to yield upon said abutment. The stop at the forward edge is movable to allow the belts to move the document off the platen onto a receiving tray.

9 Claims, 4 Drawing Figures

4,147,339

SHEET FEED AND POSITIONING MECHANISM

This is a continuation, of application Ser. No. 669,558, filed Mar. 23, 1976, now abandoned.

BACKGROUND OF THE INVENTION

The present invention relates to a sheet feed and positioning mechanism which may be advantageously utilized for feeding and positioning an original document for electrostatic reproduction on a platen of a copying machine.

In the present state of the art of electrostatic copying, an original document for copying is placed face down on a glass platen for imaging. This operation is generally performed by hand. Copying of a large number of identical documents is necessarily slow due to the length of time required for this manual operation.

Automatic mechanisms for feeding original documents onto platens are known, which utilize the center of the document as a reference and generally comprise timers or complicated mechanical arrangements for terminating the feeding at the proper point. All of such known mechanisms are, however, inaccurate, complicated and expensive to manufacture.

SUMMARY OF THE INVENTION

It is therefore an object of the present invention to provide a sheet feed and positioning mechanism which overcomes the disadvantages of the prior art.

It is another object of the present invention to provide a sheet feed and positioning mechanism comprising endless belts which move a document in the form of a sheet over the surface of a platen at an angle to the edges of the platen into aligning abutment with elongated stops disposed along the edges of the platen toward which the sheet is moved.

Other objects, together with the foregoing, are attained in the embodiment described in the following description and illustrated in the accompanying drawings.

DESCRIPTION OF THE PREFERRED EMBODIMENT

While the sheet feed and positioning mechanism of the invention is susceptible of numerous physical embodiments, depending on the environment and requirements of use, substantial numbers of the herein shown and described embodiment have been made, tested and used, and all have performed in an eminently satisfactory manner.

Figure 1:
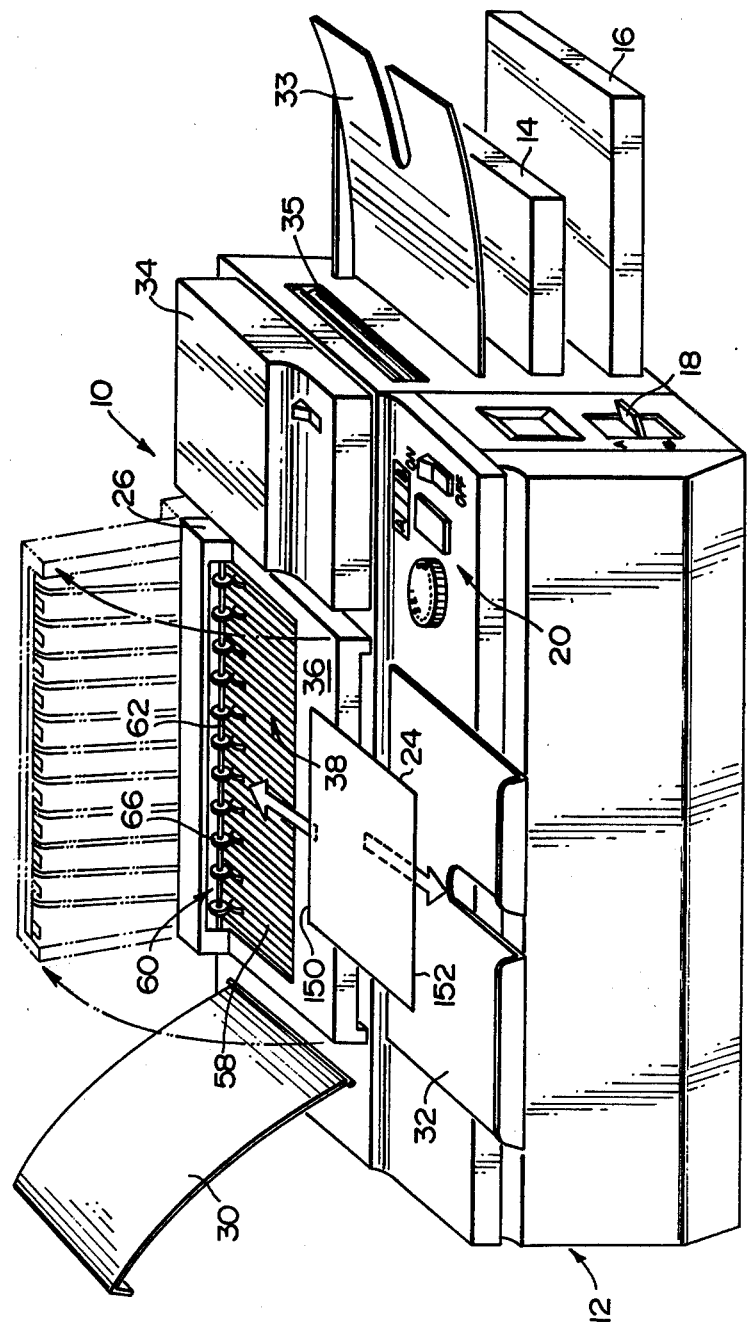
FIG. 1 is a perspective view of part of an electrostatic copying machine and a sheet feed and positioning mechanism embodying the present invention.

A sheet feed and positioning mechanism embodying the present invention is designated as 10 in FIG. 1 and is disposed on top of an electrostatic copying machine 12. The copying machine 12 as shown has various features such as copy paper cassettes 14 and 16 for copy paper of different sizes and a switch 18 for selecting one of the two cassettes 14 and 16. Other switches are generally designated as 20 which are provided to control the copying operation.

Figure 2:
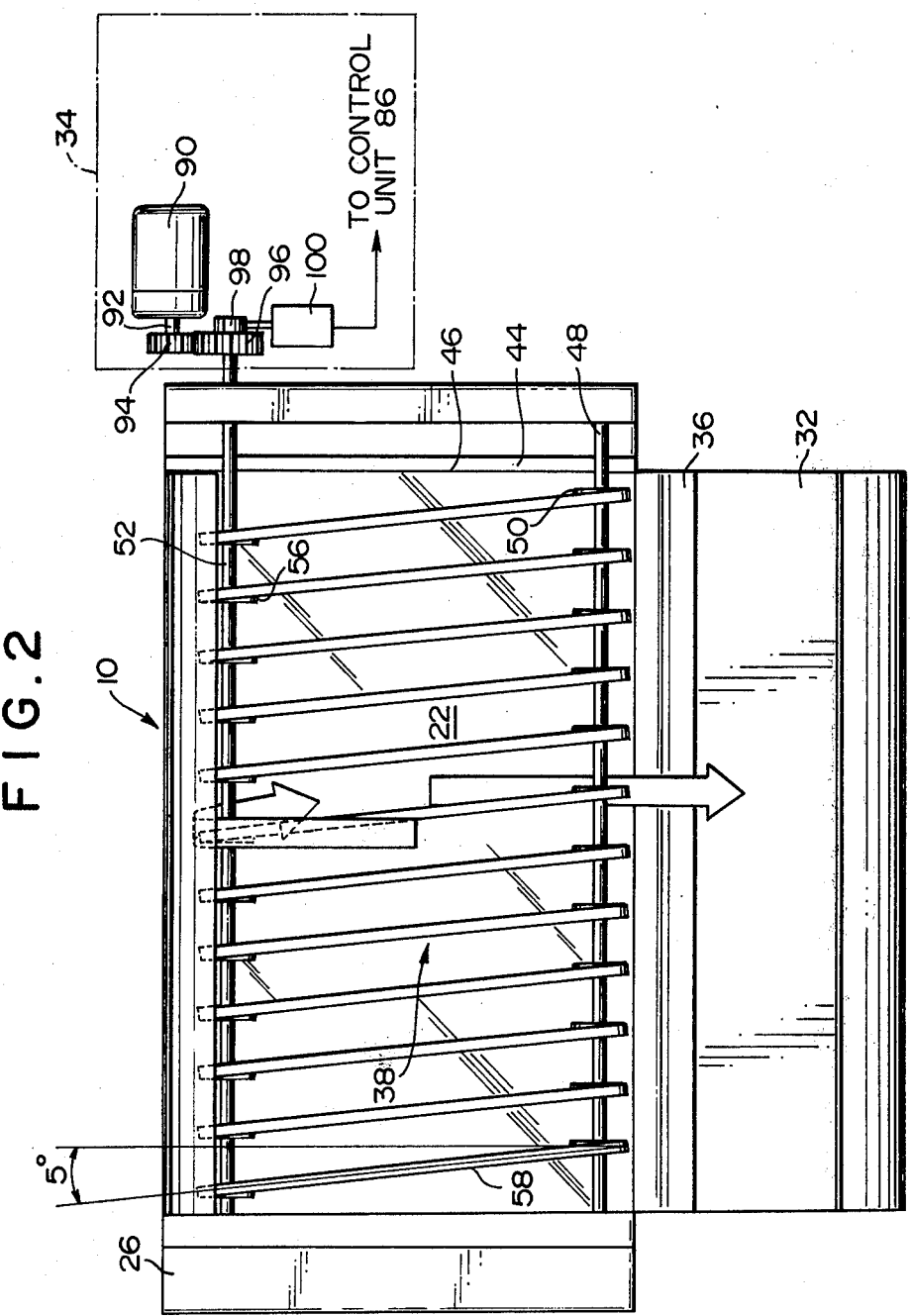
FIG. 2 is an overhead view of the sheet feed and positioning mechanism.
Figure 3:
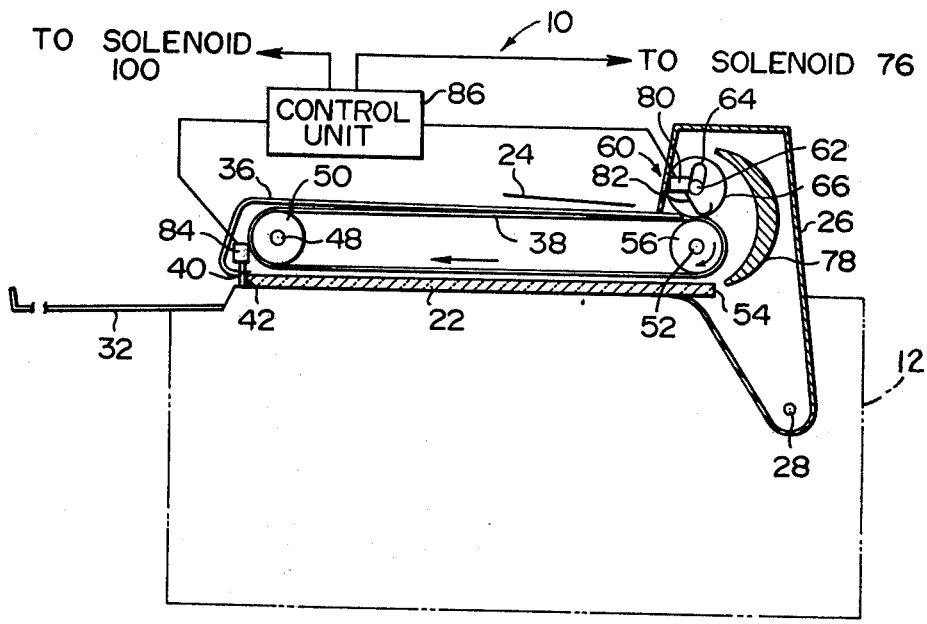
FIG. 3 is a longitudinal sectional view of the sheet feed and positioning mechanism.

Referring also to FIGS. 2 and 3, the copying machine 12 comprises a rectangular glass plate or platen 22 which is substantially horizontally disposed. An original document 24 for reproduction is adapted to be placed face down on the platen 22 for imaging exposure. The mechanism 10 comprises a body 26 which is pivotally connected to the copying machine 12 by a shaft 28 so that the body 26 can be rocked away from the platen 22 to the position shown in phantom line in FIG. 1. When the original document 24 is in sheet form as shown, the body 26 is in the position shown in solid line and a presser plate 30 is pivoted to the position shown. To copy a thick original document such as a book (not shown), the body 26 is rocked to its phantom line position and the book is placed face down on the platen 22. The presser plate 30 is rocked downward into pressing engagement with the book to hold the desired page in firm engagement with the platen 22. Also shown are a receiving tray 32 to receive the document 24 after it is discharged from the mechanism 10, a copy receiving tray 33 to receive copies from a discharge opening 35 and a drive gear box 34 provided next to the body 26. If desired, the gear box 34 may be made integral with the body 26, although not shown.

Referring in combination to FIGS. 1 to 3, the body 26 has an upper surface 36 over which the document 24 is slid as indicated by an arrow. An elongated stop 40 is provided along a first edge 42 of the platen 22 and a second elongated stop 44 is provided along a second edge 46 of the platen 22. An idler shaft 48 is disposed along the edge 42 and supports a plurality of idler pulleys 50, only one of which is designated, for rotation. A drive shaft 52 is rotatably supported along a third edge 54 of the platen 22 and has a plurality of drive pulleys 56, only one of which is designated, fixed thereto for unitary rotation. The number of drive pulleys 56 is equal to the number of idler pulleys 50 and the pulleys 50 and 56 are equally spaced on the shafts 48 and 52 respectively. A plurality of endless belts 38 are trained over the pulleys 50 and 56 to form a plurality of parallel runs 58, only one of which is designated. The runs 58 form an angle of preferably 5° with the second edge 46 so that the lower surfaces of the runs 58 move both forwardly and laterally over the platen 22 toward both the stops 42 and 44.

Figure 4:
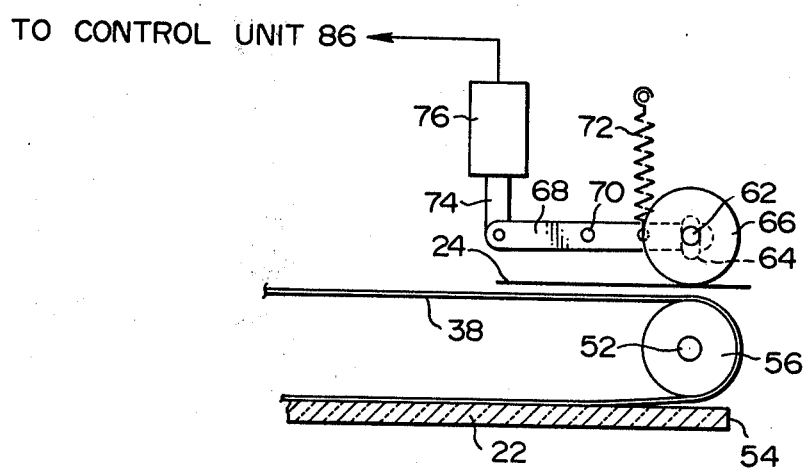
FIG. 4 is a fragmentary sectional view of part of the sheet feed and positioning mechanism.

The body 26 is formed with an inlet 60 through which the document 24 is inserted into the body 26. A feed idler shaft 62 is disposed along the third edge 54 of the platen 22 parallel to and above the drive shaft 52 and has its opposite ends slidable in vertical grooves 64 in the body 26 (only one groove 64 is visible). A plurality of feed idler rollers 66, only one of which is designated, are rotatably supported by the shaft 62 above the drive pulleys 56 respectively. As shown in FIG. 4, the shaft 62 is pivotally supported at a right end of a lever 68 which is pivotal about a shaft 70. The lever 68 is biased counterclockwise in FIG. 4 by a tension spring 72 so that the rollers 66 are held out of engagement with the belt 38. The left end of the lever 68 is pivoted to a plunger 74 of a solenoid 76 so that when the solenoid 76 is energized the plunger 74 will rotate the lever 68 clockwise against the force of the spring 72.

Shown in FIG. 3 is a guide member 78 having a concave surface facing the third edge 54 of the platen 22. A switch 80 is provided at the inlet 60 and has an actuator member 82 extending downwardly into the path of the document 24 as the document 24 is inserted into the inlet 60. Another solenoid 84 is provided which, when energized, moves the stop 40 downwardly to the position shown in FIG. 3. The switch 80 and solenoids 76 and 84 are connected to a control unit 86 as will be described below.

In FIG. 2, a drive motor 90 is mounted in the gear box 34 which has a shaft 92. A gear 94 is fixed to the end of the shaft 92 which meshes with a gear 96 rotatably mounted on the drive shaft 52. A clutch 98 is provided to connect the gear 96 to the drive shaft 52 when a solenoid 100 is energized by the control unit 86.

In operation, the solenoid 76 is initially de-energized so that the feed idler rollers 66 are held above the belts 38 by the spring 72. The solenoid 100 is de-energized so that the clutch 98 is decoupled and the drive shaft 52 is stationary. The solenoid 84 is de-energized so that the stop 40 is raised upward away from the edge 42 of the platen 22.

To feed the document 24 onto the platen 22, the operator simply inserts the document 24 into the inlet 60. A leading edge 150 of the document 24 engages with the actuator member 82 of the switch 80 to close the switch 80. The control unit 86, in response, energizes the solenoids 84, 100 and 76. Energization of the solenoid 84 causes the same to move the stop 40 downwardly below the edge 42 of the platen 22. Energization of the solenoid 100 causes the clutch 98 to engage thereby connecting the drive shaft 52 to the shaft 92 of the motor 90 to be driven thereby. The shaft 52 and drive pulleys 56 rotate clockwise in FIG. 3 to move the belts 38 clockwise as shown by arrows.

Energization of the solenoid 76 causes the lever 68 to pivot clockwise thereby moving the feed idler rollers 66 downward into engagement with the document 24. The document 24 is pinched between the feed idler rollers 66 and the portions of the runs 58 of the belts 38 which are trained over the tops of the drive pulleys 56. The document 24 is thereby fed rightwardly in FIG. 3 into engagement with the guide member 78. Due to the configuration of the guide member 78, the document 24 is guided downwardly and then leftwardly and inserted between the lower surface of the belts 38 and the platen 22. As a trailing edge 152 of the document 24 clears the actuator member 82, the switch 80 opens. In response, the control unit 86 de-energizes the solenoid 76 to disengage the feed idler rollers 66 from the belts 38.

The belts 38 are trained over the pulleys 50 and 56 in such a manner that a clearance of preferably 0.2 mm is left between the bottom surfaces of the belts 38 and the upper surface of the platen 22. When, however, the drive pulleys 56 are driven the upper portions of the runs 58 will be stretched whereas the bottom portions of the runs 58 will be slackened. In this manner, the bottom surfaces of the belts 38 engage with the upper surface of the document 24 sufficiently to move the document 24 over the surface of the platen 22. The direction of movement is both leftward toward the stop 40 in FIG. 3 and rightward in FIG. 2 toward the stop 44. The edge of the document 24 facing the stop 44 aligningly abuts thereagainst so that even if the edge of the document 24 was not originally parallel to the stop 44 it will be made parallel thereto through the abutment. The straightened document 24 is moved straight leftward thereafter since further movement toward the stop 44 is impossible. The leading edge of the document 24 then abuts against the stop 40 and is stopped completely thereby. Due to the above described clearance between the belts 38 and platen 22, although the belts 38 engage with the document 24 sufficiently to move the same into abutment with the stops 40 and 44, the engagement of the belts 38 and the document 24 is yieldable to the extent that the belts 38 will slide over the surface of the document 24 when the document 24 is in abutment with the stops 40 and 44.

The document 24, in alignment with the stops 40 and 44 is in a predetermined position for an imaging exposure by the copying machine 12. The control unit 86 is provided with a first timer (not shown) which de-energizes the solenoid 100 at a predetermined time after the leading edge 150 of the document 24 closes the switch 80 which is sufficient for the leading edge 150 to abut against the stop 40. This stops movement of the belts 38 during the imaging exposure. At the same time, a signal is fed from the control unit 86 to the copying machine 12 to initiate the imaging exposure.

After another predetermined time which is sufficient for the copying machine 12 to complete the imaging exposure, a second timer (not shown) of the control unit 86 re-energizes the solenoid 100 to resume movement of the belts 38 and de-energizes the solenoid 84. As an alternative arrangement, the copying machine 12 may feed a signal to the control unit 86 signalling the end of the imaging exposure. De-energization of the solenoid 84 causes the stop 40 to move upwardly out of the path of the document 24 so that the belts 38 move the document 24 off the platen 22 onto the receiving tray 32.

Many modifications are possible within the scope of the present invention. The solenoid 76 may be omitted and the feed idler rollers 66 urged into contact with the belts 38 at all times. The clutch 98 and solenoid 100 may be omitted and the belts 38 driven continuously. The switch 80 may be omitted and a similar switch, photosensor or the like provided at the stop 40 to initiate the imaging exposure.

If at least one timer is provided in the control unit 86, it need not be of high precision and may be of simple configuration comprising a resistor-capacitor discharge circuit or mechanical cam (not shown). The operation of the mechanism is also free from disturbances arising from variations in temperature, power supply voltage, etc.

The present mechanism is especially suitable for an automated system for copying a stack of debit notes or the like, in which a separator-feeder (not shown) would be provided to feed the documents one by one into the inlet 60.

What is claimed is:

1. A mechanism for feeding and positioning a sheet on a substantially horizontal rectangular plate, comprising in combination:

a first elongated stop disposed along a first edge of the plate;

a second elongated stop disposed along a second edge of the plate which is perpendicular to the first edge;

an idler shaft disposed adjacent to the first stop;

a plurality of idler pulleys supported for rotation by the idler shaft;

a drive shaft rotatably supported adjacent to a third edge of the plate which is parallel to the first edge;

a plurality of drive pulleys fixed for rotation with the drive shaft;

a plurality of endless belts trained over the drive and idler pulleys respectively to form a plurality of parallel runs, said plurality of belts being disposed closely above and parallel to the plate, each belt having a lower surface and forming an angle with the second edge of the plate so that the lower surfaces of the belts are movable in a direction toward both the first and second stops and yieldably engageable with the sheet when the sheet is inserted between the plate and the belts so as to move the sheet into aligning abutment with the first and second stops and release the sheet upon said abutment;

control means to stop movement of the belts at a predetermined time after the sheet abuts against the first stop and resumes movement of the belts at a second predetermined time after the first predetermined time;

a feed idler shaft disposed parallel to and above the drive shaft;

a plurality of feed idler rollers supported for rotation by the feed idler shaft above the drive pulleys respectively;

biasing means urging the feed idler rollers toward engagement with portions of the endless belts trained over the drive pulleys respectively;

a guide member disposed adjacent to the third edge of the plate in such a manner that the sheet when inserted between the belts and the feed idler rollers is fed thereby into engagement with the guide member which guides the sheet into insertion between the belts and the plate; and means for pivotally mounting the mechanism so as to be rockable away from the plate.

2. A mechanism for feeding and positioning a sheet on a substantially horizontal rectangular plate, comprising in combination;

a first elongated stop disposed along a first edge of the plate;

a second elongated stop disposed along a second edge of the plate which is perpendicular to the first edge;

an idler shaft disposed adjacent to the first stop;

a plurality of idler pulleys supported for rotation by the idler shaft;

a drive shaft parallel to said idler shaft and rotatably supported adjacent to a third edge of the plate which is parallel to the first edge;

a plurality of drive pulleys fixed for rotation with the drive shaft;

a plurality of endless belts trained over the drive and idler pulleys respectively to form a plurality of parallel upper and lower runs, said plurality of belts having their longitudinal axes disposed in parallel planes and each belt being disposed closely above and parallel to the plate, each belt having a lower surface and forming an angle with the second edge of the plate so that the lower surfaces of the belts are movable in a direction toward both the first and second stops, said belts being constructed and arranged such that during operation, slack in the lower runs will cause the latter to yieldably engage the upper surface of the sheet when the sheet is inserted between the plate and the belts so as to yieldably move the sheet into aligning abutment with the first and second stops and release the sheet upon said abutment;

a feed idler shaft disposed parallel to and above the drive shaft;

a plurality of feed idler rollers supported for rotation by the feed idler shaft above the drive pulleys respectively;

biasing means urging the feed idler rollers toward engagement with portions of the endless belts trained over the drive pulleys respectively; and a guide member disposed adjacent to the third edge of the plate in such a manner that the sheet when inserted between the belts and the feed idler rollers is fed thereby into engagement with the guide member which guides the sheet into insertion between the belts and the plate.

3. The mechanism of claim 1, further comprising a sheet receiving member disposed adjacent to and below the first edge of the plate and first stop actuator means to move the first stop away from the plate so that the belts can move the sheet onto the sheet receiving member.

4. The mechanism of claim 1, in which the control means comprises sensor means responsive to a position of a leading edge of the sheet.

5. The mechanism of claim 4, in which the sensor means comprises a switch having an actuator movable by the leading edge of the sheet.

6. The mechanism of claim 1, further comprising a spring urging the feed idler rollers away from engagement with the belts, the biasing means comprising an actuator to urge the feed idler rollers against the force of the spring.

7. The mechanism of claim 6, further comprising sensor means operative to energize the actuator to move the feed idler rollers into engagement with the sheet and belts to feed the sheet toward the guide member in response to a leading edge of the sheet being inserted between the feed idler rollers and the belts and to de-energize the actuator in response to a trailing edge of the sheet passing between the feed idler rollers and the belts.

8. The mechanism of claim 7, in which the sensor means comprises a switch having an actuator member movable by the sheet.

9. The mechanism of claim 1, in which the parallel runs form an angle of approximately five degrees with the second edge of the plate.

* * * * *